Figure 1:
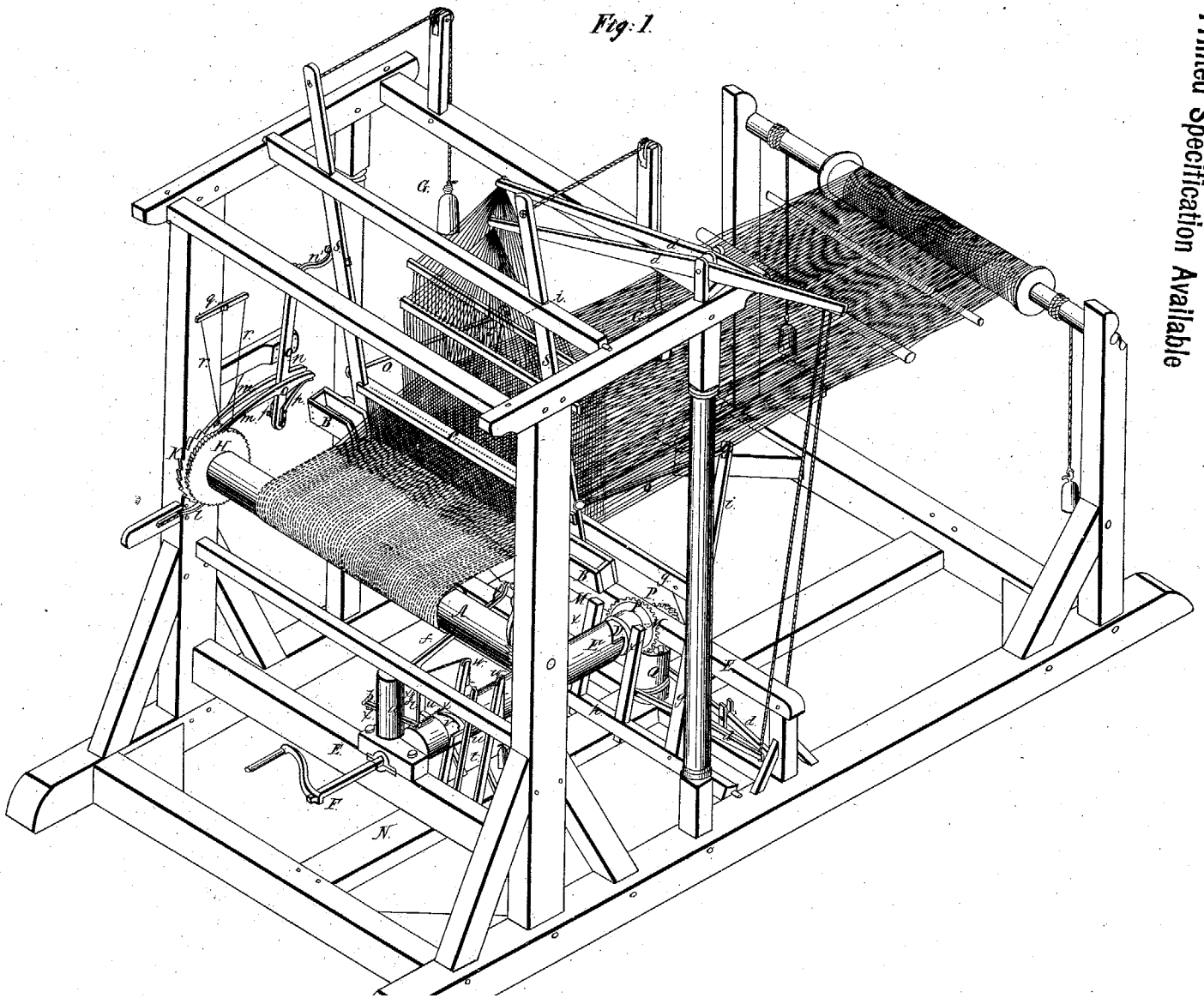

1391X

P. C. Curtis.
Loom.

Patented Nov. 17, 1810.

No Printed Specification Available

N. PETERS, PHOTO-LITHOGRAPHER, WASHINGTON, D. C.

Nov 17

Philo Clinton Curtis
Letters Patent 1391X

The Schedule referred to in these Letters Patent and
making part of the same containing a description in the
words of the said Philo Clinton Curtis himself of an im-
proved Water Loom. The improvements which
I claim as my invention in the Loom, are, the taking
up of the cloth on the cloth-roller or beam as the process
of weaving is performed, and the mode of communicat-
ing motion to the shuttle, the Lathe or Batten and
the treadles by a revolving grooved cylinder turned by
a winch or otherwise. On one end of the Cloth roller
or Beam, I place two ratchet wheels one of which is
permanently attached to the roller, and which I term
the taking up wheel. the other, which is near the form-
er, moves round the beam, being prevented however
from changing its position thereon unless operated on by
the hand or pall, by a spring which presses upon it from a
fixed beam or bar below. The palls or hands which act up-
on these ratchet wheels are fixed near the lower end of a
vertical break, turning on pivots near the centre, they
are kept down upon the wheels by weights or springs
and have a cord or communication rising from one
of them to the end of a balance lever above the beam,
and descending from the opposite end of the said balance
lever to the other pall or hand; so that when one of the
hands is depressed by the spring or weight into the notch
of its ratchet wheel, the pall or hand shall be raised
out of the notch of its wheel, one only of the palls or hands
acting on its wheel at one time. The upper end of the
break which holds the palls is moved backward and
forward by a horizontal pitman connected also with the
vertical

1391X vertical bar which forms that side of the Lathe or Batten. The mode in which these ratchet-wheels and hands or palls act is this; the ratchet wheel which moves round the beam has its periphery so divided into teeth that the full swing of the Batten just moves the pall or hand so far back as to remove it one notch and suffer the hand to fall therein, an so as to keep the other pall or hand which would act upon the taking-up wheel out of the teeth thereof by means of the cord above mentioned, when however so much is wove on the web that the Lathe or Batten cannot have its fu swing, then the pall does not enter the notch in moving ratchet wheel but will rest on its edge between the notches, and the other pall or hand which acts upon th taking up wheel will fall into the notches thereof, an the moving backward of the batten will propell the ratc wheel and roller by means of the hand or pall, and s much of the web will be wound upon the roller as will allow the Batten again to have its full swing i and the pall on the moveable ratchet wheel to have i operation, From near the middle of the transverse bar which extends across the frame in front of the Loom, th lies horizontally lengthwise of the loom to another bar unde the batten a grooved cylinder which is turned by a hand or in any other manner and communicates all the motio necessary to the process of weaving. This cylinder may be of any convenient diameter and acts in the following man- ner. For throwing the shuttle, there are two upright or verticle levers having their lower extremities attache by pins to an horizontal beam at the bottom of the frame. From each of these levers, near the top, pro- jects a pin which enters a groove in the cylinder whi has one side cut spirally round the frame so as to mo the upper end of the levers alternately forward towards i front front of the loom, they being drawn back to their position
suddenly by a weight which acts on them by a cord and
pulley at each revolution of the cylinder. There is another
cord wire, chain or pitman extending from the head of each
of these levers, to an upright cylinder to which they are fas-
tened or to arms projecting from an upright roller on
the transverse bar above mentioned, so that as the levers
advance towards or are by the weights drawn from, the front
of the loom, they will give this cylinder or roller a motion
from side to side. An arm extending from this cylin-
der or roller horizontally, either above or below the box
of the lathe or batten throws the shuttle in the same
manner as it is now thrown in weaving with the fly
shuttle. For moving the Batten backwards, prepara-
tory to the stroke, there is a frame, moved by the cylin-
der above described. This frame has an horizontal sill
or bar extending from side to side of the loom, and turn-
ing on pivots in the lower side sills thereof. From
this arises at each extremity a bar which may have
its upper ends connected with the batten. There are
two other upright bars extending from the lower bar of
this frame one on each side of the cylinder, and which
have projecting pins that enter a groove therein, and are
by it carried backward so as to move the lathe. The
lathe is moved forwards and makes its stroke by means
of weights acting on uprights extending above its hanging
pins or by springs as may be deemed best in practice.
The end of the cylinder nearest the centre of the loom
has upon it placed a wheel with bevel geared teeth, which
acts on a similar wheel on the top of one or more ver-
tical cylinders, which by grooves and pins move any
number of treadles extending from the back part of the
frame. There may be friction rollers introduced on
the 420. 1391X the pins which act in two grooves of the cylinders if fou[illegible]
necessary. The other parts of the Loom are of the usual
construction. and made to suit the nature of the busin[illegible]
to be performed, and the force employed may be either
manual or that of Horses, water, wind or Steam, a[illegible]
may best suit in the manufactories where this Loom [illegible]
introduced Witnesses Present
Alex.r Rogers
Nich.s King Philo C. Curtis

[illegible]

Exd
W.G.C.